United States Patent [19]

Pitchon et al.

[11] 4,165,834

[45] Aug. 28, 1979

[54] FOAM GENERATOR

[75] Inventors: Esra Pitchon, Flushing, N.Y.; Martin S. Colton, Avon, Conn.; Walter S. Kemprowski, Parkridge, N.J.; Marvin Schulman, Monroe, N.Y.

[73] Assignee: General Foods Corporation, White Plains, N.Y.

[21] Appl. No.: 793,694

[22] Filed: May 4, 1977

[51] Int. Cl.² ............................................ B05B 17/00
[52] U.S. Cl. .................................... 239/10; 239/432; 239/504; 239/590.3; 111/1
[58] Field of Search .................... 169/14, 15; 239/145, 239/8, 428.5, 432, 504, 310, 590.3, 10; 111/1

[56] References Cited

U.S. PATENT DOCUMENTS

| | | | |
|---|---|---|---|
| 2,645,292 | 7/1953 | Williams | 169/15 |
| 2,826,399 | 3/1958 | Eriksson | 169/15 X |
| 2,829,874 | 4/1958 | Freeman | 239/504 X |
| 2,965,309 | 12/1960 | Parrott | 239/310 |
| 3,481,545 | 12/1969 | Cooke et al. | 222/611 X |
| 3,713,404 | 1/1973 | Lavo et al. | 111/1 |
| 4,071,195 | 1/1978 | Kuhns et al. | 239/599 |

*Primary Examiner*—John J. Love
*Attorney, Agent, or Firm*—Thomas R. Savoie; Daniel J. Donovan

[57] ABSTRACT

Methods and apparatus for the topical treatment of vegetation or terrain therefor, comprising expressing a multiplicity of discrete foam structures with the plant agent composition as a spray to provide a treated surface with controlled application of plant agents e.g. using the foam structures as markers.

6 Claims, 3 Drawing Figures

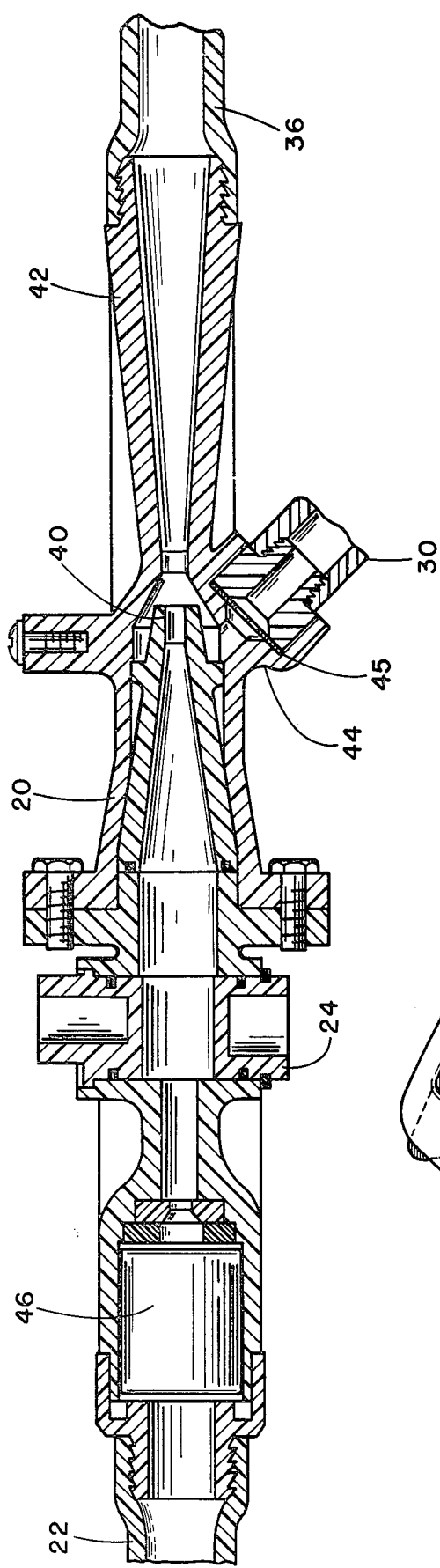
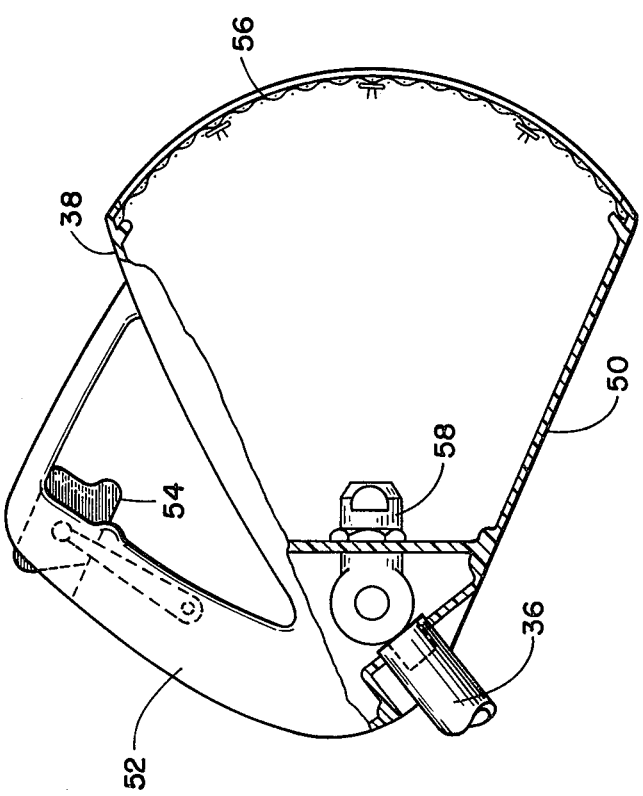

FOAM GENERATOR

BACKGROUND OF THE INVENTION

This invention relates to systems, including methods and apparatus for the facilitation of the topical treatment of vegetation, or terrain therefor. Specifically, the invention is directed to small scale equipment and processes usable under local conditions to reliably apply plant agents by hand, as in the case of a hand held portable foam generator/applicator supplied with a source of low pressure water. Typically, the self-contained unit is coupled by means of an ordinary garden hose to a residential water supply.

Spray application of chemical agents is a familiar technology ranging from use for fire fighting to agricultural application from low flying planes, truck platforms or similar rigs. In such operations, a highly pressurized source of fluid is invariably supplied as from a hydrant or a pump, or by virtue of an ancillary airstream. System geometry of a complex nature, or internal vanes and the like are commonly required to generate the particular type of foam required.

Typically (see e.g. U.S. Pat. No. 2,492,037 to Freeman, et al or U.S. Pat. No. 3,424,250 to Thomae) foams of the fire fighting variety are of high expansion i.e. exhibit a high ratio of air to water and the spray configuration is that of a hollow cone ranging to a fog. Solid streams are usually desired for projection over a greater distance, although a solid stream does not ordinarily provide enough surface area to generate more than the wet, or low expansion type foam. See Timpson U.S. Pat. No. 2,146,605 and Lacks, et al U.S. Pat. No. 2,894,694.

Agricultural usage of this technology has been in many respects similar for large scale application where pressurized systems can be readily made available, and substantial utilization justifies the expense of considerable engineering. Control of rate of application is essential with most plant agents and additional ecological concern applies in the case of such materials as pesticides; hence potential difficulty with drift is evident, especially in relatively high expansion systems. Small particulate form may be pin-pointed as the most obvious source of tendency toward drift, and this is also associated with high expansion foam. Hence, Sachnik in U.S. Pat. No. 3,694,512 emphasizes foams having an expansion ratio much lower than that typical for fire fighting, covering the range only up to 16:1. The resultant foam has the form of globules on the order of 1/32 to ⅛ inch in diameter. Spraying systems disclosed in this and related U.S. Pat. Nos. 3,604,509; 3,618,856; and 3,701,482 rely on a pressurized fluid source or available airstreams. Guth, in U.S. Pat. No. 3,764,293 shows similar agricultural spraying with liquid droplets of at least 200 to 800 microns, to minimize drifting.

The principle utility of foams heretofore for both fire fighting and agricultural purposes is to serve as a blanket, of sufficient thickness to control air access, prevent volatilization of soil additives, or to minimize frost damage. More recently, it has been appreciated that the presence of the foam aids in visibility to establish coverage. However, no change has occurred in the practice of generating a composition substantially foamed throughout, which is applied as a coherent layer of appreciable thickness without lateral interruption. Such layers of foam are often undesirable in preventing access of air and light to the underlying substrate. Thus, grass may be so damaged even where the foam is dissipated over a short term.

The increased popularity of home gardening, and the expense of commercial servicing has activated interest in homeowner application of plant agents. U.S. Pat. Nos. 3,713,404, 3,871,130 and 3,922,977 of Lavo, et al. to the common assignee describe systems and methodology adapted to this interest, the texts of which are incorporated herein by reference. Disclosed is a method for the application of plant agents utilizing a garden hose coupled to a residential water supply providing a stream of water at a static pressure of about 15 to about 70 psig wherein the stream of water is introduced to a foam generation zone, a foam concentrate comprising a foaming agent and a plant agent is educted into the stream by a venturi arrangement, the mixture is mechanically agitated, and the proportion of water and foam concentrate controlled to maintain a dilution of 15 to 90 parts by volume of water to each part of concentrate, and the thus formed foam providing solution is then directed against a foraminous barrier through which a current of air is simultaneously and unidirectionally forced, whereupon the solution is spumed for application into a deformable foam.

While the equipment contemplated by Lavo et al. operates to effect the satisfactory broadcasting of foams in residential environments, it is desired to improve upon these designs. A principal objective in any such system is to maximize simplicity in construction and use. Accordingly, pressurization of the fluid source by pumps or use of air blast generators and the like is impractical. It will be understood that many of the internal geometric aspects of prior equipment operate efficaciously only in conjunction with pressurized fluids. Since homeowner operation is of necessity restricted to the low and often variable pressures available from the residential water supply coupled to a simple and economic foam generation system usable as a portable hand held device, different design considerations apply.

Applicants have now devised equipment and developed technology meeting such criteria, embodied in the following description.

GENERAL DESCRIPTION OF THE INVENTION

In accordance with this invention a foamed composition is produced which is characterized by a disrupted or discontinuous form as projected or applied. Such a configuration provides better mechanical control over application, and also permits the foamed portions to act as markers at discrete locations evidencing coverage. The foam is fully distributed and can therefore be more readily applied evenly without damage to underlying plant life, even at fully coverage.

Although the foam portions are self adhesive or cohesive they develop upon projection into discrete, separate, generally spherical structures. Since the entire composition exhibits the same foaming capacity throughout, the disrupted nature of the projected foam is attributed to the mechanics of its preparation. The foamed portions may be superimposed upon application if desired but are widely dispersed as projected and may be isolated by an appreciable distance determined by the sweep of the applicator to form an archipeligated surface, wherein the foam balls or domes act as spot markers or tracers for even distribution of plant agent carried by the composition. The foam balls themselves may be of several different dimensions within the same composition, but may range from about ½ up to 1 inch or more in average diameter. Following application, the composition including the foamed portions is dissipated by drainage, desiccation and the like over a short term, within a period of hours.

The foamed spray under low pressure is projected only over a relatively short distance, on the order of 5–20 feet, in a configuration sometimes called F-shaped in this art. The method of application is described hereinafter in respect of the preferred equipment.

The apparatus which has been designed for the purposes of this invention utilizes the precepts of Lavo, et al U.S. Pat. Nos. 3,713,404 and 3,871,130 and accordingly employs a foam generation zone to which a liquid stream is introduced, a venturi arrangement by which a foam concentrate consisting of a foaming agent and a plant agent is educted into the stream from a separate source, and a foraminous barrier against which the stream is projected.

A particular feature of the present invention is the nozzle construction selected for interrelated operation with other design aspects as hereinafter described. Such a nozzle directs the projection of the diluted foam providing solution against and through the foraminous barrier. The nozzle of choice provides a relatively solid rather than hollow stream. The stream shape defined is not critical, but a flat spray, having an elliptical or rectangular form of greater width in one dimension is preferred for ease of related construction detail and resultant application. The preferred configuration embodies an elliptical, ovaloid or lenticular opening defined in and about a generally spheroidal nozzle terminus, the major dimension of which subtends an arc about the sphere. Subtended angles of 65° to 80° in the ellipse are most preferred although depending upon operating conditions a range of 55° to 90° may be suitably employed. The most preferred nozzles are those denominated Vee Jets and manufactured by Spraying Systems Co. Certain embodiments are illustrated in U.S. Pat. No. Des. 198,356.

While operative detail is not entirely delineated, it is believed that the angle of dispersion of the spray at the dilution factor employed is critical to the production of the disrupted foam of this invention. Thus, under comparable conditions with an otherwise identical nozzle an angle of 50° produces a fully coalesced foam rather than the desired discrete form.

The nozzle structure is arranged and aligned such that the flat spray is projected toward and through a specifically constructed foraminous barrier disposed within a defined arc and radial distance from the nozzle orifice. The barrier or screen may be suitably carried in a fan like enclosure and is wrapped about a circular arc having the nozzle at its center. The radius is optimally 5 inches for the preferred screens of 4 to 8 mesh, but may range from about 4 to about 6 inches. Smaller distances result in inadequate foaming; whereas longer distances reduce projection below operable levels. The barrier itself is preferentially selected to be of a rather coarse nature, and should be constructed of a surface wettable material. Larger orifices tend toward the production of smaller bubble sizes with high projection, and smaller orifices lead to the converse. A two inch wide 6 mesh screen of 0.035" wire disposed about a 9" arc typifies the fan construction. Also suitable are 4 mesh, 0.080" wire screens, and 8 mesh, 0.025" foramina.

Also most important to the proper functioning of the instant system, especially under lower temperature ambient conditions or where low water temperatures prevail is the provision of sufficient contact time between foaming agent and diluent. For water temperatures of 50° F. such contact time should be no less than 1.10 sec. at a foam agent concentration of 0.15% in water. To assure the necessary contact dictated by operating conditions, there is provided an enclosed zone defined in the simplest embodiment by a ¾" hose of 4' length which extends between the point of eduction and dilution and the projecting nozzle. For this purpose, as well as ease of directing the spray, the concentrate storage zone and eductor is most conveniently separated from the nozzle/screen applicator by a freely movable mixing vehicle constituted by common hosing.

As the present system is critically designed to particularly accommodate homeowner use and conditions, flow control is significant, and is ordinarily provided by means of a variable area distortable orifice, such as that disclosed in U.S. Pat. Nos. 2,389,134 or 2,454,929. A rubber device manufactured by Vernay Laboratories of Yellowsprings, Ohio is suitable. By the use of this element, flow rate is controlled and limited to the range of 4.5 to 5.0 gal/min, or 2.75 to 4.85 gm/min. Lower rates are associated with higher expansion foams, and the rate control approach automatically tends to compensate for pressure variations in residential water systems.

The amount of dilution employed may vary with the type of plant agent and application, but is generally adapted to provide 0.0002 to 0.003 parts by weight of foam agent as applied, and is controlled at the point of eduction by a concentrate control orifice. Modification in the orifice dimension may be desirable to accommodate coarse plant agent dispersions of higher insoluble content especially of relatively large particle size, but otherwise is related to the system generally in its anticipated environment. Thus, for fertilizer application utilizing water at 50° F., the orifice employed is of 0.0781 inches diameter. Values of 0.01 to 0.10 inch are contemplated.

BRIEF DESCRIPTION OF THE DRAWINGS

Reference may now be had to the detailed description of a foam generating and spraying apparatus for the treatment of vegetation or terrain therefor, taken in conjunction with the accompanying drawings, in which:

FIG. 2 is an enlarged sectional view of the eductor section of the apparatus taken along the lines 2—2 in FIG. 1; and FIG. 3 is a sectional view of the foam expanding and spraying portion of the apparatus.

DETAILED DESCRIPTION

Figure 1:
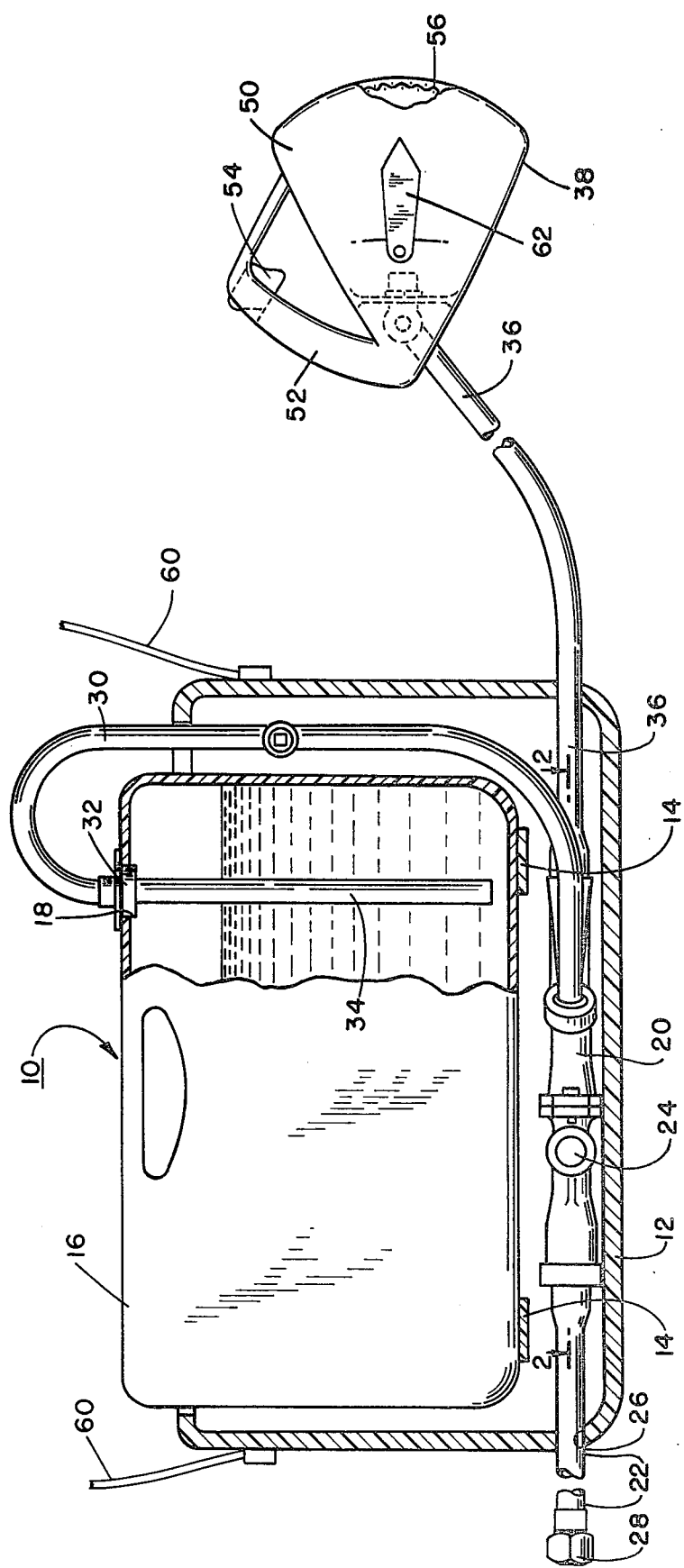
FIG. 1 illustrates generally schematically a sectional view of the foam generating and spraying apparatus constructed pursuant to the invention.

Referring now in detail to the drawings, and particularly FIG. 1, there is illustrated a foam generating and spraying apparatus 10. The apparatus includes a suitable housing 12 formed of a plastic material which is open at the top thereof.

Insertable into the housing 12, so as to be supported on internal ledges 14 integrally formed with the housing, is a receptacle 16, similarly constructed of a plastic material. The receptacle 16 includes a filler aperture 18 through which a foam concentrate may be introduced into the receptacle. At the upper end of housing 12, the opening therein is dimensioned so as to generally conform to the peripheral dimension of the receptacle so as to permit the latter to be closely supported within the housing without excessive lateral movement.

Located in the interior of the housing 12 and extending across the bottom length thereof is an eductor 20. A hose 22 is connected to the eductor 20 at one end of the former through the intermediary of a flow-control valve 24 forming part of the eductor assembly. The hose 22 extends outwardly of housing 12 through an aperture 26, and has a suitable connector 28 at the opposite end thereof adapted for connection to a supply of water, such as a garden hose faucet connection (not shown).

The eductor 20 is connected to a valved flexible tube 30 which leads upwardly out of the housing 12 and connects to an attachment 32 fastened in the filler aperture 18 of receptacle 16. An aspirating tube 34 leads from attachment 32 into the lower portion of receptacle 16 so as to have the lower end thereof extending below the level of foam concentrate in the receptacle.

At the forward or downstream end of the eductor 20, the latter terminates in a nozzle, described in greater detail hereinbelow. Connected to the nozzle is a hose 36 which leads to an expansion chamber and foam ejector arrangement 38.

The eductor 20, as shown more closely in FIG. 2 of the drawings, includes the control valve 24 which is adapted to be manually regulated by suitable control wires or the like leading from a control switch which is mounted on the arrangement 38.

The eductor 20 includes a nozzle 40 which terminates in a discharge housing 42, the latter of which is connected to the hose 36. A boss 44 is located immediately upstream of the nozzle surface, and forms a connection to the hose or tube 30 for aspiration of the foam concentrate from the receptacle 16, employing the well-known Venturi principle. The flow of foam concentrate may be controlled by selection of a closure device 45 seated in the opening to the Venturi zone at the terminus of tube 30. Suitably employed is a 0.750 dia. ×0.035 in. membrane with a pair of slits at right angles centered therein, suitably of 0.38 in. length.

Upstream of the control valve 24 there may be located a suitable safety check valve 46 which is connected to the hose 22.

As illustrated in FIG. 3 of the drawings, the expansion chamber and foam ejector arrangement 38 has a generally V-shaped housing 50. The housing has a handgrip portion 52 formed integrally therewith, which supports a manually operable control switch 54 for the control valve 24. The control switch 54 and control valve may be operably interconnected through suitable control guy wires (not shown) which extend along the exterior surface of the hose 36 and may be encompassed by support sleeves. As noted above, the flow control valve 24 preferably constitutes a variable area distortable orifice.

The housing 50, as well as the eductor 20 and control valve 24, may be constructed of plastic materials in order to constitute a light-weight structure which is relatively inexpensive to manufacture. The forward or hose portion of the V-shaped housing 50 forms an open area or aperture within which there is located an arcuately curved wiremesh screen 56. Located proximate the apex end of the housing 50 is distributor nozzle 58 (supported in housing 50 by detail not shown) which communicates with the outlet end of the hose 36.

The operation of the foam generator apparatus is as follows:

The receptacle 16 is filled with a foam concentrate, the aspirating tube 34 inserted therein and then fastened by means of closure 32. Connector 28 is connected to a source of low pressure water, such as a garden hose connection, which may then be turned on while maintaining control valve 24 in a closed position through control switch 54 so as to prevent any flow through eductor 20.

Apparatus 10 may be suspended from the shoulder of an operator by means of a shoulder strap 60 which is connected to opposite ends of the housing 12.

In order to commence foam spraying, the control switch 54 is pushed to the operative or "on" position, thereby opening valve 24 to permit flow of water therethrough and through the nozzle 40 of the eductor 20. The flow of water will create a so-called "Venturi" effect at boss 44, so as to thereby aspirate foam concentrate from receptacle 16 into tube 30, causing it to be admixed with water immediately downstream of eductor nozzle 40 in the eductor housing 42. The extend of actuation of switch 54 will determine the rate of flow through the control valve 24 and eductor 20.

The admixed foam concentrate and water then flow through hose 36, in which they are mixed into an incipient foam forming composition while being propagated towards the expansion chamber and foam ejector arrangement 38. Upon the composition being expelled into housing 50 through the distributor nozzle 58, the foam expands and exits in a discrete manner through the wiremesh screen 56.

When it is desired to flush the apparatus with water, a lever 62 mounted on the exterior of housing 50 may be actuated so as to shut off the flow of foam concentrate into eductor 20 and to thereby allow only water from hose 22 to flow therethrough, by means of wires (not shown) leading to a valve in tube 30.

The foam ejector or applicator structure constitutes a significant feature of the present invention, as now more fully described.

Nozzle 58 may provide a convergent or a divergent flow or expansion is effected. Preferably the nozzle terminates in a constrictive region in which the flow is diverted into the desired rectangular type by forced passage through an orifice limited in a first cross-sectional dimension and of controlled but greater dimension in the normal thereto. As noted above, an ellipsoidal or ovaloid configuration is typical, wherein length to width, or aspect ratio, is at least 1.5:1 up to about 3:1.

Suitably, the exit portion of the nozzle is formed as a spherical section e.g. a hemisphere in which the orifice is formed. Accordingly, the orifice may also be defined by the arc subtended in the major and minor dimensions. In the most preferred embodiment, the ellipsoidal section constitutes in general form that shown in FIG. 3 of U.S. Pat. No. Des. 198,356 i.e. an about 2:1 length to width ratio orifice formed of mating concave sections defined as lenticular. The angle of arc subtended by the major dimension of the orifice is 55 to 90, most preferably 65°–80°.

For protection of the orifice structure as well as to further define the spray pattern, the leading edge may be built up i.e. extended forwardly of the orifice, as shown in FIG. 1 of U.S. Pat. No. Des. 198,356. Thus, along the major orifice dimension there are facing forwardly extending walls forming an acute angle of about 45–85%, preferably about 60° with the apex at the orifice, the angle of the walls opening equally away from the cross-sectional plane.

The internal nozzle section leading to the spheroid section may be circular ranging to ovaloid, as will be dictated by the convenience of machining or other production considerations, but is not critical. However, construction detail is understood to be effected with a view to the provision of streamlined, rather than turbulent flow, and a circular section is preferred.

The length of the nozzle structure is not critical but in the most preferred embodiment the constrictive section formed by the hemisphere has a diameter less than ½ inch, for a coupling from a standard ¾" hose.

The nozzle 58 in operation provides a rectangular form of solid (rather than hollow) spray, about an arc controlled in major dimension by the length of the lenticle or ellipse, or the angle of subtended arc and in minor dimension by the width of the orifice. The spray accordingly forms an expanding arc with the nozzle at its apex.

The spray is intercepted by a foraminous barrier 56 located at a common fixed position from the nozzle at each point of the intercepted arc. Accordingly, the barrier itself assumes a curvilinear e.g. circular circumferential position about the nozzle at a fixed radius. Best results have been achieved with the aforementioned preferred nozzle configuration where the indicated radius is between 4 and 6 inches.

While not wishing to be bound by hypothetical explanations, it is presently believed that the production of the discrete foam structure of the present application is a function of the physical and mechanical interaction of the foamable composition and the applicator features, particularly the interrelated nozzle configuration and the foraminous barrier aspects. It appears that the foamed composition in its incipient state, although of uniform foaming power and cohesive nature is disrupted in the course of and at an early state of its formation and during expansion, by passage through the restrictive orifices of the barrier in such manner as to produce the projected foam balls of the invention.

Although foramina of any otherwise suitable type may be employed, the orifice dimension is believed significant and best results have been achieved where the dimension is equivalent to that provided by a 4 to 8 mesh screen. Modified but acceptable results may be anticipated over the adjacent range.

Spraying operations will in all respects be affected by environmental conditions. However, a significant advantage of the present design is that the impact of such factors has been minimized. Thus, while air and water temperatures and pressures, altitude, relative humidity and the like can make successful operation of spray equipment difficult or at least sporadic, the present design is capable of efficient, continuous operation over a wide range of conditions with satisfactory uniformity of plant agent application.

Generally, it is wise to effect spraying operations at air temperatures of 50° F. or more, and water temperatures not below 40° F. It will be understood that greater foaming i.e., higher expansion ratios will result in the case of higher water temperatures, and appropriate modifications may accordingly be justified in the level of dilution or the manner of application employed as desired by the user.

Summarizing the operation of the system: the rate of supply of the projecting fluid is established as noted above by an orifice of controllable dimension and the degree of dilution is similarly determined by the selection of concentrate control orifice. The premix or concentrate is educted through a venturi arrangement into the liquid stream established through the foam generation zone, at a suitable rate of dilution, and the thus formed foam providing solution or dispersion is passed through an extended zone for further interaction between plant agent and diluent involving mixing, solvation, surface wetting or other phenomena. The stream is then formed into a projecting spray of incipient foam-forming character by passage through a nozzle as described. The foaming spray is projected through a spaced foraminous barrier and the foam applied to the surface being treated.

In accordance with a preferred embodiment, the nozzle and foraminous barrier elements are contained in a lightweight arc shaped applicator equipped with a handle and suitable controls and the foam is projected therefrom over and about the treated surface in a generally vertical spray i.e., the long dimension of the nozzle orifice and the screen are positioned fixedly relative to the handle such that normal application would dispose them vertically to the ground. The generally F-shaped spray may project 5 to 20 feet, with a relatively even distribution of foam balls formed therein being dispersed freely about the treated surface in a manner controlled by the sweep of the applicator. With some limited experience and information regarding dosage level required, the homeowner can readily direct the spray controllably and if desired, utilize the foam balls as markers, a few inches or more apart.

This invention comprehends the use of various foam producing concentrates each of which are formulated to provide the desired degree of foam expansion and the proper longevity of the foam after application when employed as a carrier for specific plant agents or combination of agents.

The concentrate may comprise a liquid vehicle ranging from an aqueous system to an oil base, as may be dictated or rendered convenient by the operation in question and the nature of the chemical cconstituents included within the plant agent compositions which are used therewith.

The preferred starting material incorporates the plant agent and foam generating constituents in a dry formulation which is premixed with a liquid vehicle shortly before use to a concentration, suitably of about 3.5% by weight then stored for eduction into the liquid stream. Such a dry formulation and its use is more fully described in commonly assigned application Ser. Nos. 793,693 and 793,802, of Ravallo and Colton, Pitchon and Ravallo, respectively, filed concurrently herewith and incorporated herein by reference.

The concentrates, especially fertilizer containing systems, may comprise a significant proportion ranging up to 20 to 25% by weight of insoluble or dillicულty soluble material, in the form of discrete particles or small clumps thereof, which may not be entirely dispersed even with substantial mixing. Ordinarily the system is shaken or mechanically agitated for a brief period e.g. about 30 seconds, to form the concentrated solution, suspension or dispersion of foam generating constituents and the material or materials intended for treatment.

The foam-providing concentrates utilized in the invention may also be those of the Lavo, et al patents aforementioned.

Understandably, the invention encompasses combinations of different additives and differently selected ratios or quantities of additives for the purpose of tailoring foam-providing concentrates to yield foam products having specific desired characteristics for use in particular types of plants, plant foliages and soils.

The 'foam' of this invention are of restricted durability i.e. are resistant to immediate degradation and of sufficient cohesiveness to permit visual differentiation under normal conditions for periods of at least 5 to 30 minutes, but gradually degrade below the noticeable level over the short term i.e. within 1-2 hours. In other respects, the foams are deformable rather than stiff or resistant to the touch as would characterize a set, hardened or cured foam, and of sufficient surface stickiness to resist removal from the surface to which it is applied by light breezes. Reference to a disrupted foam herein is to be distinguished from the condition referred to as a broken foam, the latter denoting a degradation or breakdown of the ultimate foam structure rather than a stable static condition involving discrete foam formations intended by the former. The foam balls to which reference is made are believed to be made up of a multiplicity of invidiaully foamed particles comprising the usually bubbled configuration cohesively structured into the three dimensional spheres or domes seen upon projection and application.

These foams may exhibit an expansion ratio of 2:1 up to 200:1 but preferably are of intermediate scale, being of the order of 8:1 up to 80:1. The water powered foam generator will dilute the concentrate with about 15 to 90 preferably 20 to 50 parts by volume of water to one part of concentrate (to provide 0.0002 to 0.003 parts of foam agent as applied). Coverage for such a system will be about 2500 ft.$^2$ in less than 5 minutes at a water rate of 4.75 gpm.

An acceptable expansion ratio may be determined visually with some experience, but initially may be ascertained by reference to the following test: A foam applicator, positioned about 48 inches from the substrate and elevated about a foot above the eduction point is utilized to project foam onto a measured surface (for convenience, one or more three liter beakers provide suitable means for capturing the foam in a measurable manner.) The measured quantity of foam (in case of beakers, filled to the top) is allowed to lie at rest for 5 to 10 minutes, the water drained or otherwise separated in a measured manner and the expansion ratio calculated as follows:

$$\text{Expansion Ratio} = \frac{\text{foam volume}}{\text{water volume}} = \frac{\text{Total volume} - \text{water volume}}{\text{water volume}}$$

Measurements are made with tap water between 50° and 75° F., at flow rates of 4.1 gal/min to 2.75 gal/min.

The term plant is used in its normally broad sense as inclusive of bushes, flowers, shrubs, foliage, trees, grass etc. although it is understood that mechanical application in accordance herewith is of the short throw variety ordinarily connected with ground application.

Those agents which can be applied by the methods of the invention, in addition to seeds, include but are not limited to, organic and inorganic fertilizers, herbicides, fungicides, insecticides, pesticides, sterilants, minerals, hormones and like materials commonly used in agriculture for the maintenance or nurture of plant life, or the control or eradication of pests or disease therein, or the presence of undesired species thereabout.

The following Examples are offered by way of illustration of the various aspects of the present invention, without limitation.

EXAMPLE I

An applicator according to the preferred aspects of the present invention was utilized to apply a fertilizer composition to an established lawn.

The fertilizer composition was reconstituted from a dry mix having a consistency somewhat between flour and sand, with an appearance rather like buckwheat pancake mix. The composition (formulation A of Example III) included a significant content of difficulty soluble material up to about 25% of the whole. It had been stored under ambient conditions in a sealed container for thirteen months. About 3.5 lbs. was emptied into the removable receptacle 16 and mixed thoroughly with 1030 cc. of water by shaking vigorously for about 30 sec. Dilution was established such that 600-900 cc. of concentrate was educted for each 4 gallons of water discharged. First, the lever 62 was set to permit a backflush which effected the cleaning of the eductor 20. Then a water rate of about 15,000 cc./min. or 3.9 gpm was established, through a conventional garden hose at common residential pressure conditions. With commencement of concentrate eduction, and mixing through a connecting 4 ft., ¾" hose from back pack to hand held applicator, incipient foam formation through an 80-100 Spraying Systems H-U nozzle (80° arc, solid stream type) and projection of foam formations through a 6 mesh, 0.035" screen at a uniform 5" distance resulted in the broadcasting of discrete foam balls with the plant agent composition. With a relatively easy arc of application, it was possible to mark the grass with a multiplicity of the foam structures. Typical such 'markers' were 1–3" in diameter, entirely separate from one another although individually cohesive and deformable and lay as much as a foot apart depending upon the rate of application. These structures were durable enough that the prior pass could be accurately perceived upon completion of a lawn circuit. The appearance of the surface was that of a group of islands i.e. an archipeligo. Ultimately, within 30 minutes or so, degradation was apparent. In various tests over water temperatures ranging from 45° to about 95° F. foam formation was similar, with larger foam balls formed for marker use at the elevated temperatures.

EXAMPLE II

A series of Spraying Systems Type H-U nozzles of varying capacities having major exit angles ranging from 30° to 80° were tested in conformity with Example I, utilizing a flow rate of 23 lb./min., an eduction rate of 300–350 ml/min., and a 16 mesh screen.

30° and 40° nozzles were totally unacceptable, and although improvement was seen at 65° only uniform small droplets of foam were produced. The 80° nozzle produced the best results, especially at higher capacities, hence testing was continued with 4,6,8,10,12,16,20 and 30 mesh screens at varying distance, nozzle to screen. Only froth of low expansion (8:1 up to 13:1) was obtained with the larger dimensioned i.e. greater than 8 mesh screens, whereas a bubbly cohesive foam was obtained with the smaller screens providing higher expansion ratios of up to about 20:1. Expansion ratios of greater than 16:1 could be consistently obtained, and discrete foam structures produced, with the 6 mesh screen, positioned 4½ to 5½" from the nozzle exit. Best results were secured with an 80–100 Spraying Systems nozzle at a controlled water rate, utilizing a 6 mesh (0.035" wire) screen at a 5" distance from the nozzle. Water rates of 2.75 to 4.85 gm/min. were employed at a minimum water temperature of 45° F. using ¾ to 1" hose, with at least a 40" length from eduction to discharge.

EXAMPLE III

The optimum system of Example II was tested further with a series of the plant agent compositions of Lavo, U.S. Pat. No. 3,713,404 ranging from freshly prepared to samples stored up to 9 weeks with expansion ratios typically in the range of 20–40:1.

We claim:

1. In the projection of a foam forming solution from a low pressure source of water-based foam concentrate the improvement which comprises expressing said concentrate from and through a constricted lenticular orifice providing a solid spray with a 55° to 90° arc, substantially immediately intercepting the foam so produced with a foraminous barrier equivalent to a 4 to 8 mesh screen such that upon free expansion and dispersion of the developed foam a multiplicity of discrete foam balls is provided.

2. The process of claim 1 further comprising the step of controlling the interaction of said foaming agent and said dilution medium to provide a period of at least 1.10 sec. prior to expansion and projection of foam.

3. In an applicator for the projection of a spray of an aqueous foamable plant agent composition utilizing low pressure water the improvement which comprises the combination of a nozzle having a lenticular orifice defined in a spherical exit face subtending in major dimension an arc of 55° to 90° and a foraminous barrier with apertures equivalent to a 4 to 8 mesh screen disposed to intercept the spray projected from said nozzle, at a uniform distance about the arc of spray therefrom of 4.5 to 5.5 inches.

4. A foam generator adapted to dispense discrete particles of foam in a spray of an aqueous foamable plant agent composition comprising, in combination:

(a) an eductor connected to a source of pressurized liquid; controllable valve means located in the flow path of said liquid intermediate said source and the eductor nozzle for controlling the flow of said liquid through said eductor;

(b) a receptacle adapted to receive a quantity of a liquid concentrate; conduit means communicating the interior of said receptacle with said eductor intermediate said eductor and said valve means; tube means extending into said receptacle for aspirating an amount of said concentrate through said conduit means for admixing with said pressurized liquid said admixture being expelled through said eductor in a foam-generating relationship;

(c) generally V-shaped expansion chamber having a jet nozzle at the apex thereof, said jet nozzle having a constricted lenticular orifice providing a solid spray with a 55° to 90° arc; a hose conduit interconnecting said eductor and said jet nozzle for ejecting said foamed mixture into said expansion chamber, an outlet aperture extending along the base portion of said V-shaped expansion chamber, said outlet aperture being covered by a foraminous barrier equivalent to a 4 to 8 mesh screen such that the ejected foam is substantially immediately intercepted by said barrier and that upon free expansion and dispersion of the developed foam a multiplicity of discrete foam balls is provided.

5. A foam generator as claimed in claim 4 comprising manually operable control means for controlling said valve means for varying the rate of flow of said pressurized liquid and said admixed liquid concentrate through said eductor.

6. A foam generator as claimed in claim 4 said pressurized liquid source being a garden hose connection, said valve means adapted to convey a flow of about 4.0 to 5.0 gallons/minute, said hose conduit interconnecting said eductor and jet nozzle having a length of about 4 feet and ¾ inch diameter, said mesh screen being arcuately curved and having a length of about 9 inches and a width of about 2 inches and being spaced about 5 inches ahead of said jet nozzle.

* * * * *